United States Patent
Bouyaud et al.

(10) Patent No.: US 9,008,715 B2
(45) Date of Patent: Apr. 14, 2015

(54) METHOD OF AND APPARATUS OF COMMUNICATION BETWEEN A MOBILE STATION AND A BASE STATION

(75) Inventors: Mickael Bouyaud, Le Mans (FR); Valère Delong, Arnage (FR)

(73) Assignee: St-Ericsson SA, Plan-les-Ouates (CH)

( * ) Notice: Subject to any disclaimer, the term of this patent is extended or adjusted under 35 U.S.C. 154(b) by 313 days.

(21) Appl. No.: 13/581,444

(22) PCT Filed: Mar. 9, 2011

(86) PCT No.: PCT/EP2011/053516
§ 371 (c)(1),
(2), (4) Date: Aug. 27, 2012

(87) PCT Pub. No.: WO2011/110580
PCT Pub. Date: Sep. 15, 2011

(65) Prior Publication Data
US 2012/0322495 A1    Dec. 20, 2012

(30) Foreign Application Priority Data

Mar. 12, 2010  (EP) ..................................... 10305249

(51) Int. Cl.
*H04B 7/00* (2006.01)
*H04W 52/10* (2009.01)
*H04W 52/24* (2009.01)

(52) U.S. Cl.
CPC ............ *H04W 52/10* (2013.01); *H04W 52/241* (2013.01); *H04W 52/246* (2013.01); *Y02B 60/50* (2013.01)

(58) Field of Classification Search
USPC ............... 455/522, 67.11, 68–70, 115.3, 126, 455/127.1, 127.2, 135, 226.3, 277.2, 296; 370/318
See application file for complete search history.

(56) References Cited

U.S. PATENT DOCUMENTS

| | | | |
|---|---|---|---|
| 7,184,703 B1* | 2/2007 | Naden et al. | 455/10 |
| 8,094,727 B2* | 1/2012 | Hong et al. | 375/240.25 |
| 8,526,410 B2* | 9/2013 | Li et al. | 370/342 |
| 8,565,212 B2* | 10/2013 | Zhang et al. | 370/344 |
| 2004/0132405 A1* | 7/2004 | Kitazawa et al. | 455/13.4 |
| 2004/0152422 A1* | 8/2004 | Hoglund et al. | 455/67.11 |
| 2004/0198235 A1* | 10/2004 | Sano | 455/69 |
| 2004/0202113 A1* | 10/2004 | Moon et al. | 370/252 |
| 2004/0213185 A1* | 10/2004 | Oh et al. | 370/335 |
| 2004/0248609 A1* | 12/2004 | Tamura | 455/522 |

(Continued)

FOREIGN PATENT DOCUMENTS

| | | |
|---|---|---|
| EP | 1143751 A1 | 10/2001 |
| EP | 1811686 A2 | 7/2007 |

(Continued)

*Primary Examiner* — Dominic E Rego
(74) *Attorney, Agent, or Firm* — Coats & Bennett, PLLC

(57) ABSTRACT

A method of and a mobile terminal for transmitting data over an uplink from a mobile terminal to a base station, the data being transmitted over radio bursts, the method comprising and the mobile terminal being suitable for: assessing radio propagation conditions between the mobile terminal and the base station; determining if the radio propagation conditions fulfil a predetermined condition; wherein if it is determined that the radio propagation conditions fulfil the predetermined condition the transmission energy parameters of the signal bursts are adapted to reduce the energy used to transmit the data.

11 Claims, 9 Drawing Sheets

(56) References Cited

U.S. PATENT DOCUMENTS

| | | | |
|---|---|---|---|
| 2005/0075122 A1* | 4/2005 | Lindoff et al. | 455/522 |
| 2005/0163092 A1* | 7/2005 | Suzuki | 370/342 |
| 2005/0255830 A1* | 11/2005 | Thorson et al. | 455/411 |
| 2006/0040697 A1* | 2/2006 | Komatsu | 455/522 |
| 2006/0126755 A1* | 6/2006 | Itou | 375/297 |
| 2008/0130725 A1* | 6/2008 | Yu et al. | 375/219 |
| 2009/0149210 A1* | 6/2009 | Hosokawa | 455/522 |
| 2009/0161611 A1* | 6/2009 | Kuroda | 370/329 |
| 2009/0227259 A1* | 9/2009 | Min et al. | 455/446 |
| 2010/0048237 A1* | 2/2010 | Kishiyama et al. | 455/522 |
| 2010/0121413 A1* | 5/2010 | Willerton et al. | 607/60 |

FOREIGN PATENT DOCUMENTS

| | | |
|---|---|---|
| WO | 9637972 A1 | 11/1996 |
| WO | 0241523 A2 | 5/2002 |

* cited by examiner

METHOD OF AND APPARATUS OF COMMUNICATION BETWEEN A MOBILE STATION AND A BASE STATION

CROSS-REFERENCE TO RELATED APPLICATIONS

This application is the National Stage of International App. No. PCT/EP2011/053516, filed Mar. 9, 2011 which claims priority to European Patent App. No. 10305249.4, both of which are hereby incorporated by reference as if fully set forth herein.

FIELD OF THE INVENTION

The present invention relates in general to a method and apparatus of communication between a mobile station and a base station. Particularly but not exclusively, the invention relates to a method of voice communication in GSM 2G.

BACKGROUND OF THE INVENTION

With the development of faster and more powerful processors in many electronic devices power consumption has become an issue of increasing importance, in particular with regard to mobile electronic devices with limited power sources. Mobile devices such as, but not limited to, mobile telephones, personal data appliances, personal digital assistants (PDAs), lap top computers and the like, are sometimes required to operate for long periods of time before their power source can be recharged.

Power consumption of a mobile station is determined by the amount of energy used to transmit data, such as audio data, over an uplink to a base station (BS), as well as receive data from the base station over a downlink.

In transmission, data is grouped in blocks with each block being transmitted over a number of radio bursts. During a voice call on a mobile telephone the amount of power consumed depends on the amount of power needed to transmit audio data blocks on the uplink to the base station BS such that the base station correctly receives the information sent by the mobile telephone. The amount of power used to transmit the information over the uplink is configured by the base station with the Power Control Level (PCL) value, the channel coding parameters, modulation and source coding parameters. The total amount of transmission energy is dependent on the consumption of each component of the mobile to transmit the information and the amount of power per burst and the duration of each audio block encoded in frames. One block is encoded on S bursts and the amount of power is directly proportional to S*PCL.

In reception power consumption of a mobile station in communication with a base station will depend on the period of time during which the radio frequency sub-system of the mobile telephone phone is open to receive an audio block on the downlink and the operating parameters of the receiver. One audio block is encoded on S bursts.

Consequently an important issue for the manufacturer of a mobile station is to reduce as much as possible the power needed to transmit audio data while still enabling the BS station to decode the audio data and to reduce the time window for decoding audio blocks sent by the BS.

SUMMARY OF THE INVENTION

The present invention has been devised with the foregoing in mind.

Accordingly, a first aspect of the invention provides a method of transmitting data over an uplink from a mobile terminal to a base station, the data being transmitted over radio bursts, the method comprising: assessing radio propagation conditions between the mobile terminal and the base station; determining if the radio propagation conditions fulfil a predetermined condition; wherein if it is determined that the radio propagation conditions fulfil the predetermined condition the transmission energy parameters of the signal bursts are adapted to reduce the energy used to transmit the data.

A second aspect of the invention provides a method of receiving data at a mobile terminal over a downlink from a base station, the data being transmitted over radio bursts, the method comprising: assessing radio propagation conditions between the mobile terminal and the base station; determining if the radio propagation conditions fulfil a predetermined condition; wherein if it is determined that the radio propagation conditions fulfil the predetermined condition the reception parameters of a receiving means of the mobile terminal are degraded to reduce the energy used to receive the data.

A third aspect of the invention provides a mobile terminal for transmitting data to a base station, the mobile terminal comprising: a transmitter for transmitting data over radio bursts; a radio environment analyzer for assessing radio propagation conditions between the mobile terminal and the base station; a processor for determining if the radio propagation conditions fulfil a predetermined condition; a transmission controller for adapting the transmission energy parameters of the signal bursts to reduce the energy used by the transmitter to transmit the data when it is determined that the radio propagation conditions fulfil the predetermined condition.

A fourth aspect of the invention provides a mobile terminal for receiving data from a base station, the mobile terminal comprising: a receiver for receiving data over radio bursts; a radio environment analyzer for assessing radio propagation conditions between the mobile terminal and the base station; a processor for determining if the radio propagation conditions fulfil a predetermined condition the processor being operable a reception controller for adapting the reception parameters of the receiver to reduce the energy used to receive the data when it is determined that the radio propagation conditions fulfil the predetermined condition.

In embodiments of the invention:
the level of reception at the base station of a signal transmitted from the mobile station may be determined by determining signal power attenuation between the mobile terminal and the base station
assessing radio propagation conditions may comprise analysing an RxQual quality measurement parameter
adapting the transmission energy parameters may comprise at least one of suppressing one or more signal bursts, reducing the transmission power of one or more signal bursts and reducing the power control level;
the processor of the mobile terminal may be operable to determine the level of reception at the base station of a signal transmitted from the mobile station by determining signal power attenuation between the mobile terminal and the base station
the radio environment analyzer of the mobile terminal may be operable to analyse an RxQual quality measurement parameter
the transmission controller is operable to perform at least one of the following: suppress one or more signal bursts, reduce the transmission power of one or more signal bursts, and reduce the power control level.

the processor is operable to determine the level of reception at the base station of a signal transmitted from the mobile station by determining signal power attenuation between the base station and the mobile terminal.

the radio environment analyzer is operable to analyse an RxQual quality measurement parameter Parts of the methods according to the invention may be computer implemented. The methods may be implemented in software on a programmable apparatus. They may also be implemented solely in hardware or in software, or in a combination thereof.

Since parts of the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which: —

DETAILED DESCRIPTION

A first embodiment of a method of, of the invention will be described with reference to FIGS. 1 to 6.

Figure 1:
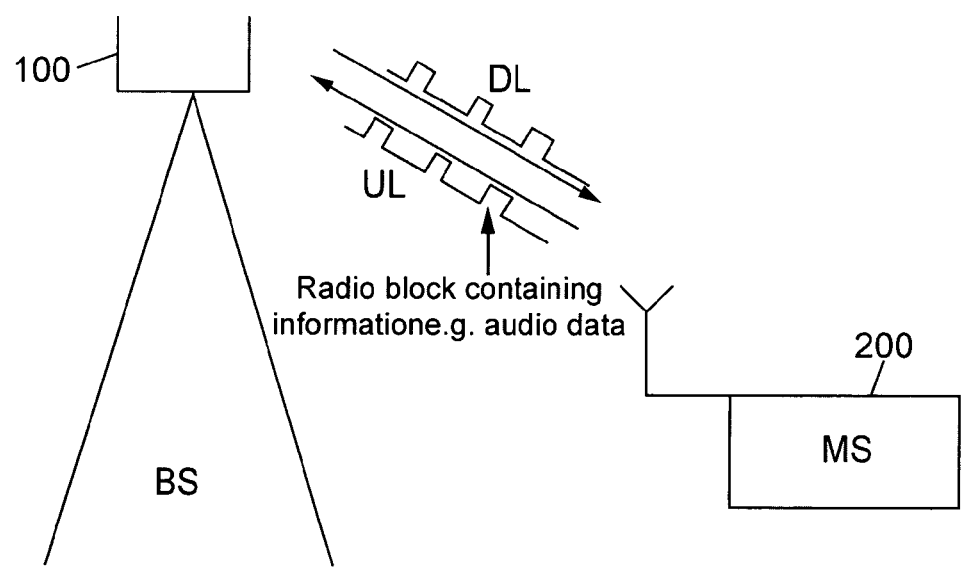
FIG. 1 is a schematic diagram illustrating communication between a base station and a mobile station

FIG. 1 illustrates communication between a mobile station and a base station in GSM 2G (Global Systems for Mobile Communications $2^{nd}$ Generation) during, for example, a voice call. The mobile station transmits audio data to the base station via an uplink UL while the base station transmits audio data to the mobile station via a downlink DL. In TCH FR (traffic channel full rate) which is the OSI (open system interconnection) model Layer 1 name for a type of GSM voice call one block of audio data after channel coding is transmitted over 4 radio bursts.

Figure 2A:
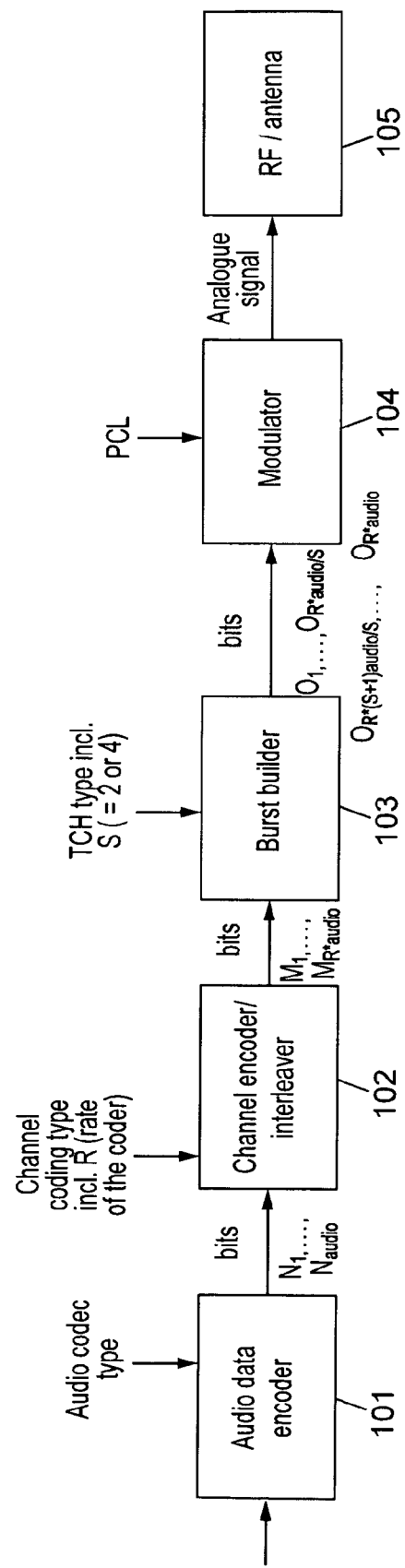
FIG. 2A is a block diagram illustrating a transmission chain of a mobile station which can be used in the context of embodiments of the present invention

With reference to FIG. 2A the transmission chain of a mobile station 100 supporting 2G radio access comprises an audio data encoder (101) for receiving analogue data from an audio source coder such as a micro-phone and encoding the analogue data according to the Audio codec type, for example Adaptive Multi-Rate (AMR) as described in the 3GPP specification. The codec type is provided by the network during the service negotiation according to the quality of service to be attained and the capabilities of the mobile station. The Audio data encoder (101) delivers blocks of data whereby the amount of data per blocks depends on the Audio codec. One block of data may be composed of several types of data. The different types of data are defined according to their importance, which determines their number and the associated level of encoding in order to protect them.

The next block on the transmission chain of the mobile station 100 is a channel encoder/interleaver 102 for receiving coded audio data and for applying a channel coding with a parameter of redundancy R. All the data of the Audio block may not have the same redundancy rate. Important data will have a higher redundancy rate while less important data will have a lower redundancy rate. In the standard the redundancy coefficient R is equal to 1, 2, 3 or 4. For R superior to 1, the used channel coder is convolutional code. This parameter is provided by the network in function of the quality of service to be attained. Once channel coded, in order to make the transmission more robust to fading i.e. loss of data over the air interface, the data are interleaved. This operation is described in technical specification TS 45.01. At the output of the channel encoder, the amount of data that will be mapped on burst is equally divided into S frames.

The next block on the transmission chain of the mobile station 100 is a burst builder 103 for collecting a data block from the channel encoder (102), dividing the data block into S sub-blocks of equal size and mapping them to the data part of the TCH burst. S is dependent on the traffic channel (TCH (type (FR, EFR, . . . ). The mapping of channel coded blocks to TCH burst is described in TS 45.008.

The transmission chain further comprises a modulator 104 for receiving TCH type bursts of data of in bits and for transforming these bits into an analogue signal. This modulation operation is described in TS 45.01. The modulator 104 introduces a notion of time. One burst is transmitted every GSM frame, i.e. every 4.615 ms. One audio block is fully transmitted after S frames, i.e. after S*4.615 ms.

The last block of the transmission chain is an RF/antenna 105. Modulated data, analogue signal, are then amplified at the PCL level and modulated on the desired frequency before being broadcast over the air by an antenna. PCL (power control level) is provided by the pair Base Station in function of the level of reception, the quality of service to reach, the negotiated audio codec, the TCH plus some infrastructure manufacturer proprietary algorithms.

It can be noted that at the output of the channel encoder, the amount of data that will be mapped on burst is equally divided into S frames.

Figure 2B:
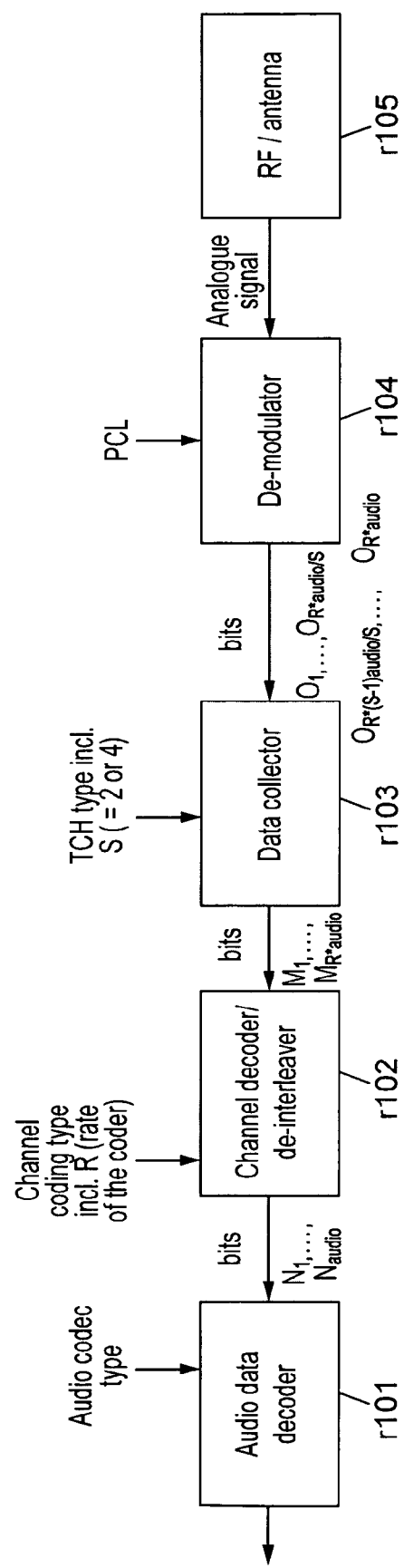
FIG. 2B is a block diagram illustrating a reception chain of a mobile station which can be used in the context of embodiments of the present invention

FIG. 2B schematically illustrates the 2G reception and decoding chain of the mobile station 100. The reception chain comprises a RF antenna r105 for receiving RF signals over the air interface, a demodulator R104 for demodulating the received signals, a data collector R103, a channel decoder/de-interleaver R102 and an audio data decoder R101. The functional blocks r101 to r105 perform the inverse operation of the corresponding blocks of the mobile station transmission chain as described above. In the reception chain instead of the PCL being provided by the network the mobile station 100 amplifies the signal at the output of the antenna r105 so that it can be decoded.

Figure 3A:
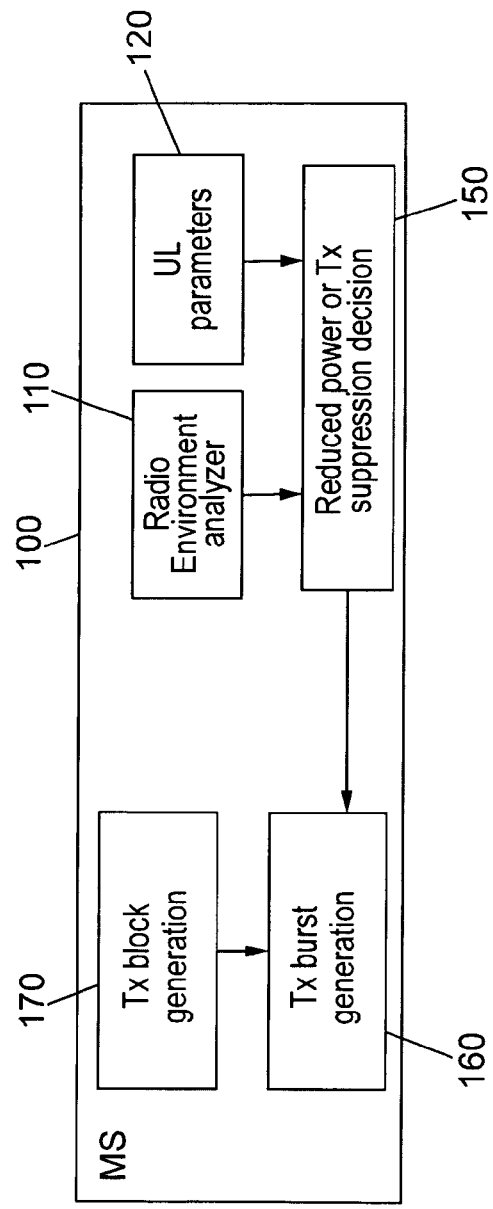
FIGS. 3A and 3B are block diagrams illustrating modules of a mobile station according to an embodiment of the invention.
Figure 3B:
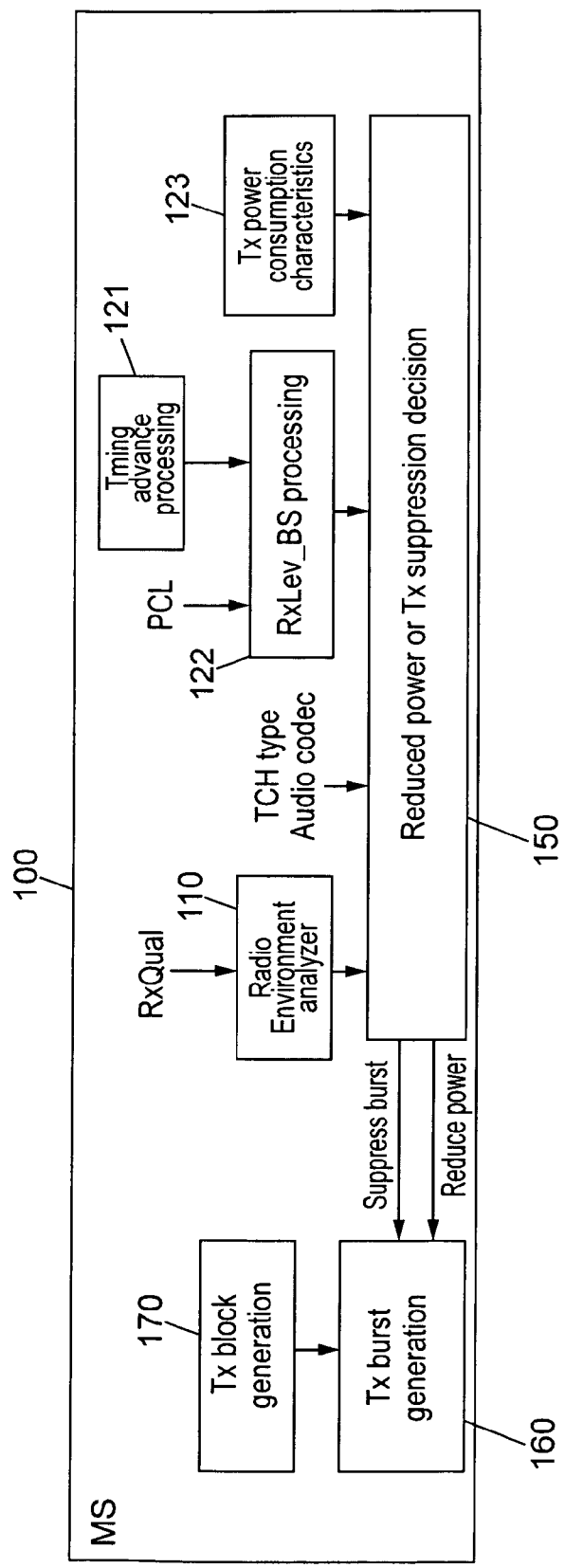

FIGS. 3A and 3B illustrate the different sub-components involved in the first embodiment of the invention and their related information flow for the reduction of the power consumption of the Transmission of Audio blocks.

With reference to FIGS. 3A and 3B the mobile station 100 further comprises a radio environment type analyser 110 for analysing the radio wave propagation conditions such as quality and path loss etc, between the mobile station 100 and the base station 200. This component can be used to determine the type of propagation channel between the mobile station 100 and the base station 200 and to analyse the fade types and size present in the propagation channel. In one embodiment of the invention the quality measurement functions Rx_Qual of 2G communications can be used to provide this information. The average value of RxQual provides the level of Noise to Interference ratio. The second level order esperance i.e. variance provides the insight on radio propagation variation.

While RxQual is used as an example in this embodiment of the invention to provide information on the radio propagation environment it will be appreciated that in alternative embodiments of the invention any other appropriate Signal to noise processing and post processing could also be used to assess the radio propagation environment.

The mobile station 100 further includes an uplink parameter module 120 for providing to a power adaption decision module 150 data parameters required for determining how to adapt the power level for audio data transmission in order to obtain an optimized level of power consumption.

The mobile station 100 is not aware of the level of reception at the base station 200 of the radio signal transmitted by the mobile station 100. In order to determine an indicator of the margin between a requested PCL and the power level effectively received by the base station the mobile station 100 may use a time advance processing module 121 which applies timing advance, required in a 2G MS, and the Friis formula to provide an attenuation parameter att as follows:

$$att = -20 \log_{10}(c \star d/(4 \star Pi \star F)) \quad (1)$$

where att is the attenuation in dB, c denotes the speed of light, d denotes the distance in metres between the mobile station 100 and the base station 200, and F denotes the frequency in Hz of the GSM carrier
On the other side, we have:

$$d = c \star (timing\_advance) \quad (2)$$

where

Timing _advance corresponds to the length of time a signal from the mobile station 100 takes to reach the base station 200. Technical Specifications 3GPP TS 05.10 and TS 45.010 describe the time advance (TA) value adjustment procedures. Any other procedure providing this distance could also be applied e.g. AGPS,. . .

Consequently the margin between the requested PCL and power effectively received at the base station antenna can be written $$RxLev\_BS = PCL - att \quad (3)$$

where:

RxLev_BS is the level of reception of mobile station signal at the base station antenna connector and PCL is the Power Control Level applied by the mobile station and provided to it by the base station. The parameter RxLev_BS is provided by the RxLev_BS processing module 122 which receives a PCL parameter input and an att parameter input from the time advance processing module 121.

The level of reception of the BS signal at the MS antenna connector is a component already exists in a 2G MS. It provides an RxLev value as described in 3GPP TS45.01 specification.

Figure 4:
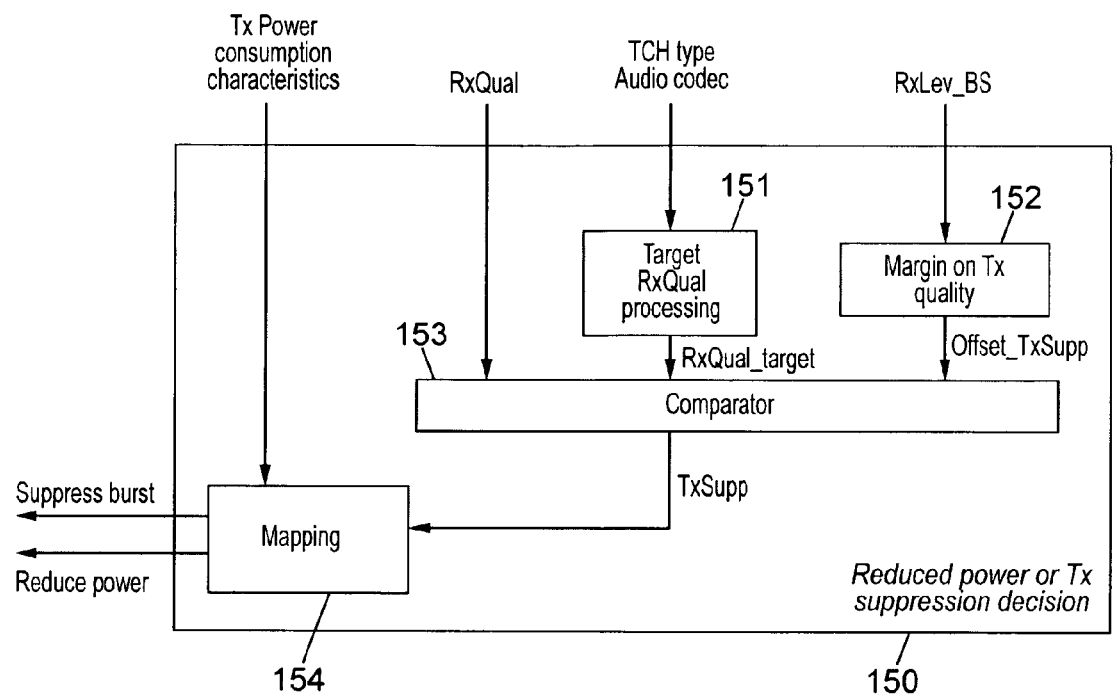
FIG. 4 is a block illustrating sub-components of a decision making module according to the embodiment of the invention.

With reference to FIG. 4, as well as receiving the radio environment characterization parameter RxQual and an indication RxLev_BS of the level of reception of the MS signal at BS side, the power adaption decision module 150 also receives audio service characteristics including the type of TCH channel and the Audio Codec; and internal characteristics of the mobile station including the power consumption of an audio block per burst and per PCL in order to determine how the transmission power may be adapted to optimize power consumption.

A Target RxQual processing module 151 includes an array containing the different levels of quality to be ensured according to the type of TCH and to the Audio codec applied. As examples of realization this array can be obtained by measurement on a different network (NW) or by simulation. A Target RxQual parameter RxQual_target is provided to a comparator 153.

A Margin on Tx quality module 152 provides an offset for the comparator 153 according to the RxLev_BS input. This offset Offset_TxSupp is proportional to the margin of power received at the input of BS antenna i.e. to RxLev_BS.

The comparator 153 determines a parameter TxSupp representative of the Uplink amount of power that can be suppressed from the total budgeted power initially needed by applying the following expression:

$$TxSupp = \min(0, \text{floor}(RxQual\_target - RxQual + Offset\_TxSupp)) \quad (4)$$

if (RxQual_target−RxQual+Offset_TxSupp) is negative, it is determined that no power can be suppressed.

A mapping component 154 determines the quantity of UL power and the way this power will be suppressed according to the TxSupp parameter received from the comparator 153 and such that the gain of power will be the biggest as well as taking into account other proprietary implementation constraints.

Figures 5A, 5B:
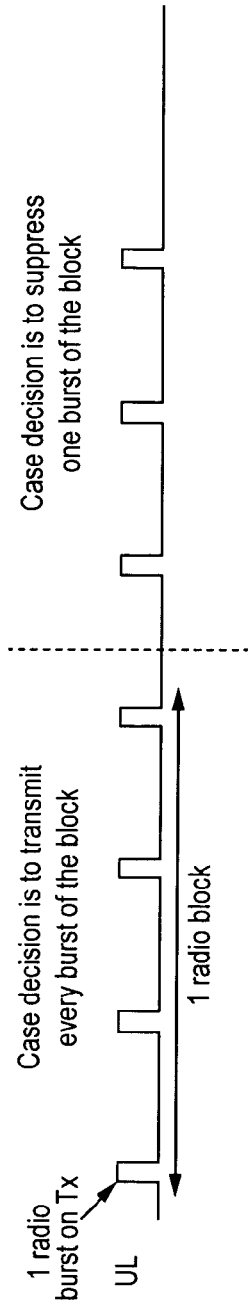
FIGS. 5A and 5B illustrate transmission configuration of bursts according to embodiments of the invention.

For example a decision may be made to transmit every burst of the audio data block as illustrated in FIG. 5A in which one radio block is transmitted over four bursts on the UL, or to suppress one burst of the audio data block as illustrated in FIG. 5B where only three bursts are transmitted. In alternative embodiments more than one burst of audio data may be suppressed.

The power control level which ranges from 5 to 19 where 5 represents the highest level of power and 19 represents the lowest level of power can be modified. A power level of one or more bursts may be modified to reduce the power consumption. In particular embodiments of the invention while the level of one or more bursts is reduced the level of one or more of the remaining bursts may be increased An Error code correction ECC module can be used to compensate for a suppressed burst or a reduction in power without compromising the quality of the voice call. ECC can be used by the base station to determine if a protected block of data of the audio block has been corrupted and is lost.

Table 1 is an example according to one embodiment of the invention in which the suppression of power according to the TxSupp parameter range is outlined

TABLE 1

| TxSupp range | Amount of power to be suppressed |
| --- | --- |
| 0 | No power reduction |
| [1; PCL[ | The reduction of power applied on $1^{st}$. Tx burst is equal to PCL − TxSupp |
| PCL | $1^{st}$ burst is suppressed |

TABLE 1-continued

| TxSupp range | Amount of power to be suppressed |
| --- | --- |
| ]PCL; 2xPCL[ | $1^{st}$ burst is suppressed and the reduction of power on the $2^{nd}$ Tx burst is equal to PCL – TxSupp |
| ... | ... |

Table 2 is an example according to another embodiment of the invention in which the suppression of power according to the TxSupp parameter range is outlined

TABLE 2

| TxSupp range | Amount of power to be suppressed |
| --- | --- |
| 0 | No power reduction |
| [1; PCL[ | TxSuppBurst = TxSupp/S<br>TxSuppBurst amount of power can be removed from each burst of the Audio block. |
| PCL | $1^{st}$ burst of the block is suppressed. |
| ]PCL; 2xPCL[ | TxSuppBurst = (TxSupp – PCL)/(S – 1)<br>$1^{st}$ burst of the block is suppressed and TxSuppBurst amount of power can be removed from each of remaining burst of the Audio block. |
| ... | ... |

The transmission burst generation module 160 receives orders from the decision module as to how to generate the transmission bursts of blocks received from transmission block generation module 170.

Figure 6:
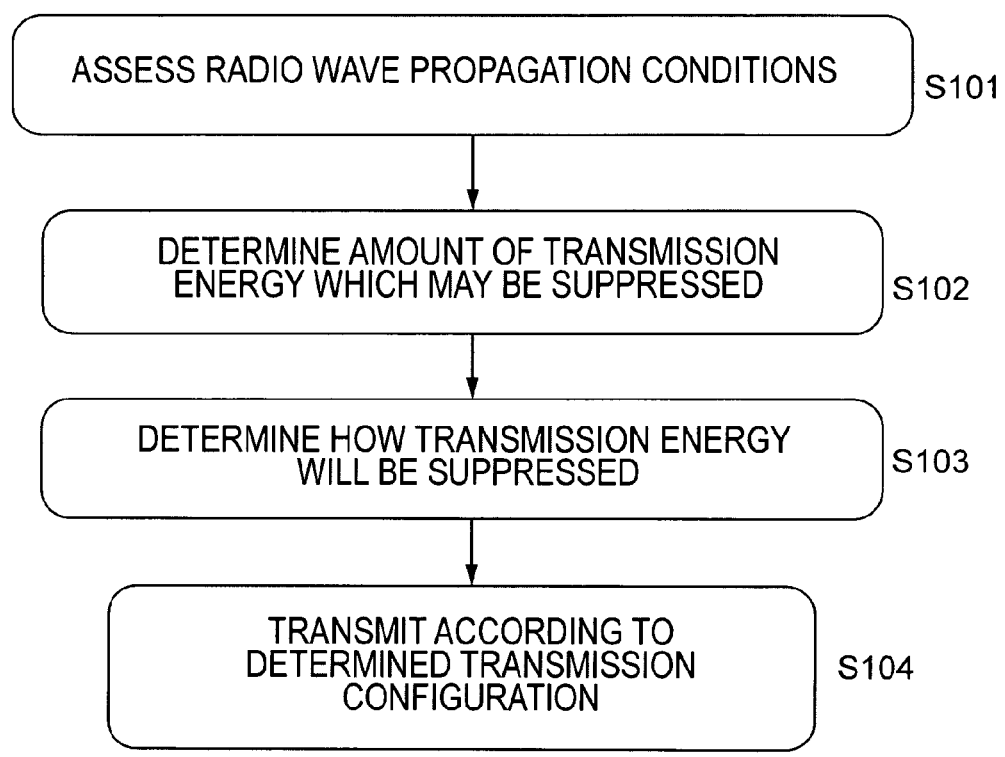
FIG. 6 is a flow chart outlining the steps of a method of communication between a mobile station and a base station according to en embodiment of the invention.

A method of communication between the mobile station 100 and the base station 200 for reducing power consumption will be described with reference to FIG. 6. In this example, the communication is established between the mobile station 100 and the base station 200 to make a voice call. The communication may be initiated by the mobile station 100 in the case where the user of the mobile station 100 makes the call, or by the base station 200 in the case where the mobile station 100 receives the call from another user.

In step S101 the radio propagation environment between the mobile station 100 and the base station 200 is assessed by radio environment analyzer module 110 as described above in order to determine parameters such as transmission quality, path loss, fading etc. A RxQual parameter is provided to Decision module 150.

In step S102 the decision module 150 processes radio environment characterization parameter RxQual, the level of reception indicator of the mobile station signal at the base station RxLev_BS, the transmission power consumption characteristics of the mobile station, the TCH type and the Audio codec in order to determine the amount of power TxSupp that can be suppressed from the total power initially set. In step S103 according to the range of TxSupp it is determined if and how the transmission power level or number of transmission bursts may be adapted to optimize the power consumption level. In step S104 the audio data blocks are transmitted to the base station according to the determined transmission configuration.

Figure 7:
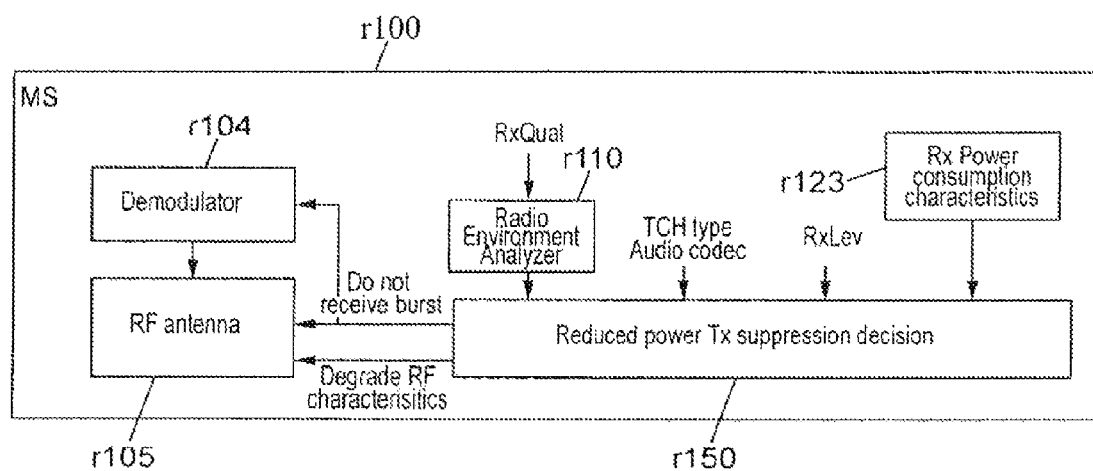
FIG. 7 is a block chart illustrating components a mobile station for adapting reception of incoming signals according to an embodiment of the invention.

FIG. 7 illustrates sub-components used to reduce power consumption when receiving audio data. Decision module r150 receives radio environment characterisation parameters RxQual from a radio environment analyser module r110, traffic channel type and audio codec parameters, a RxLev parameter and mobile station reception power consumption parameters from a module r123 in order to 25 determine how incoming audio data bursts on a downlink channel from the base station 200 should be received in order to optimise the power consumption. The decision module r150 can then command RF antenna r105 and demodulator r104 whether or not to receive an incoming burst or whether the reception characteristics of the Rf antenna can be degraded in order to reduce the reception 30 power consumption.

In embodiments of the invention data lost by suppression can be compensated by channel encoding. Channel encoding performed by the channel encoder block 102 of FIG. 2A introduces some redundancy on the important data. This redundancy plus the interleaving helps to enable data lost by fading to be recovered by channel coding.

Convolution codes, used for transporting audio blocks, do not require that the entire audio block to be transmitted in UL or received in DL. In addition, audio codec handles some losses of blocks within a certain tolerance. As an example for illustration purposes, 3GPP defines some requirements according to the Audio codec, the TCH types and propagation channels.

Consequently in embodiments of the invention if radio propagation conditions permit, the quality of transmission/reception and/or the amount of data received/transmitted can be reduced in such a way that the audio quality is not impacted.

The methods according to the embodiments of the invention reduces the power consumption of a mobile phone during voice calls in GSM 2G by suppressing a determined amount of power on the UL or DL, by reducing the used power for each burst or by suppressing one part of a burst, one complete burst or several bursts constituting a block. The robustness of convolution coder enables methods according to embodiments of the invention to be implemented for decreasing total amount of energy needed to transmit or receive data blocks.

Since the energy configured for transmission of channel coded information is often over estimated for the required audio performance leading to over consumption of energy by a mobile telephone operating in 2G during a voice call, embodiments of the invention which reduce the transmission energy reduces power consumption of the mobile phone without compromising the quality of the communication.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method, performed in a mobile station, of transmitting data over an uplink from a mobile station to a base station, the data being transmitted over radio bursts, the method comprising:
   assessing radio propagation conditions between the mobile station and the base station and representing the conditions by a radio environment characterization parameter (RxQual);
   determining a level of reception (RxLev BS) at the base station of a signal transmitted from the mobile station; and in response to at least RxQual and RxLev BS, adapting the transmission energy parameters of the radio bursts to reduce the energy used to transmit the data.

2. The method according to claim 1 wherein determining RxLev BS comprises determining signal power attenuation between the mobile station and the base station.

3. The method according to claim 1 wherein adapting the transmission energy parameters comprises at least one of suppressing one or more signal bursts, reducing the transmission power of one or more signal bursts, and reducing the power control level.

4. A method, performed in a mobile station, of receiving data at a mobile station over a downlink from a base station, the data being transmitted over radio bursts, the method comprising:
   assessing radio propagation conditions between the mobile station and the base station and representing the conditions by a radio environment characterization parameter (RxQual);
   determining a level of reception (RxLev) at the mobile station of a signal transmitted from the base station; and
   in response to at least RxQual and RxLev BS, adapting the reception parameters of a receiver of the mobile station to reduce the energy used to receive the data.

5. The method according to claim 4, wherein determining RxLev comprises determining signal power attenuation between the base station and the mobile station.

6. A mobile station operative to transmit data to a base station, the mobile station comprising:
   a transmitter operative to transmit data over radio bursts;
   a radio environment analyzer operative to assess radio propagation conditions between the mobile station and the base station and to represent the conditions by a radio environment characterization parameter (RxQual);
   a module operative to determine a level of reception (RxLev BS) at the base station of a signal transmitted from the mobile station; and
   a transmission controller operative to adapt the transmission energy parameters of the radio bursts to reduce the energy used by the transmitter to transmit the data in response to at least RxQual and RxLev BS.

7. The mobile station according to claim 6, wherein the module is operable to determine RxLev BS by determining signal power attenuation between the mobile station and the base station.

8. The mobile station according to claim 6, wherein the transmission controller is operative to adapt the transmission energy parameters by reducing the power control level.

9. The mobile station according to claim 6, wherein the transmission controller is operative to perform at least one of the following:
   suppress one or more radio bursts;
   reduce the transmission power of one or more radio bursts; and
   reduce the power control level.

10. A mobile station operative to receive data from a base station, the mobile station comprising:
    a receiver operative to receive data over radio bursts;
    a radio environment analyzer operative to assess radio propagation conditions between the mobile terminal and the base station and represent the conditions by a radio environment characterization parameter (RxQual);
    a module operative to determine a level of reception (RxLev) at the mobile station of a signal transmitted from the base station; and
    a reception controller operative to adapt the reception parameters of the receiver to reduce the energy used to receive the data in response to at least RXQual and RxLev.

11. The mobile station according to claim 10, wherein the module is operable to determine RxLev by determining signal power attenuation between the base station and the mobile terminal.

* * * * *